Patented Sept. 7, 1943

2,329,166

UNITED STATES PATENT OFFICE 2,329,166

SURFACE ACTIVE COMPOUND

Nathaniel Beverley Tucker, Glendale, Ohio

No Drawing. Application February 26, 1940,
Serial No. 320,890

10 Claims. (Cl. 260—410)

This invention relates to compounds which are surface active in that they are capable of modifying the surface tension at an oil-water interface and therefore possess emulsifying properties. The invention also relates to a process of producing said compounds.

It is an object of the present invention to provide a new class of non-resinous, fat-soluble, surface active esters.

The products of the present invention, in which a high molecular weight acyl radical possesses the fat solubilizing characteristic and a non-resinous polyhydric alcohol ester of a water-soluble hydroxy carboxylic acid is the portion of the molecule possessing water solubilizing characteristics, possess, as hereinafter more fully described, a combination of advantages not possessed by prior art products coming within the class of surface active compounds.

New chemical compounds coming within the scope of my invention may be represented by the following general formula:

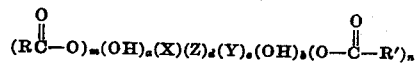

wherein R and R' are the same or different aliphatic hydrocarbon chains having seven or more carbon atoms, X is a residue of a water-soluble hydroxy carboxylic acid such as

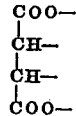

Y is the residue of a water-soluble polyhydric alcohol such as

Z is a carboxyl hydrogen attached to X; $d$ is the number of carboxyl hydrogens attached to X, which number may be zero or greater but less than the number of free carboxyl groups occurring in the original hydroxy carboxylic acid; $c$ is a small whole number at least 1; $m$ and $n$ are small whole numbers whose sum is at least 1 and which individually may be zero or greater; $a$ and $b$ are small whole numbers whose sum is at least 1 and which individually may be zero or greater, and wherein the ratio of the sum of $a$ and $b$ to the sum of $m$ and $n$ is at least 1.

My compounds can be said to consist essentially of non-resinous, fat-soluble higher fatty acid esters of an ester of a water-soluble polyhydric alcohol and a water-soluble hydroxy carboxylic acid, the higher fatty acid molecule being combined either with the OH of the hydroxy carboxylic acid or the free OH of the polyhydric alcohol or both, and the ratio of the number of free OH groups to the number of those combined with the higher fatty acid being at least 1.

In general the free fatty acid residue contains eight or more carbon atoms and for certain purposes, particularly where a solid or plastic compound is desired, the fatty acid residue may preferably contain twelve carbon atoms or more.

A simple example of the class of compounds herein concerned is the glycol ester of malic stearate which may be given the following chemical formula:

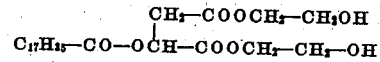

Stearic acid ester of bis-(beta-hydroxyethyl) malate

The preparation of esters of this type is complicated by the usual possibilities of polymerization and ring-formation which exists in any reaction between bi-functional molecules such as malic acid and ethylene glycol. Apparently in order to obtain non-resinous surface active fat-soluble esters it is desirable to suppress polymerization reactions as much as possible and to maintain conditions which favor the formation of the simplest possible structure as represented by the example given above. Four methods of approach to this objective may be indicated as follows.

1. The water-soluble hydroxy carboxylic acid may be esterified directly with a very large excess of water-soluble polyhydric alcohol, thus favoring the reaction of only one hydroxyl of each alcohol molecule. The excess polyhydric alcohol may then be removed. The product formed may contain some lower polymers in addition to the simple esters, but polymerization has not proceeded far enough to render it unfit for use in the preparation of my products.

This ester of hydroxy acid and polyhydric alcohol is then reacted with a fatty acid halide such as a chloride or bromide whereupon some, but not more than one half, of the free hydroxyl groups of the water-soluble esters are esterified.

In the case of products prepared in this manner, there is no easy way to determine what position is occupied by the high molecular acyl group introduced, that is, whether the second esterification involves one of the hydroxyls of the hydroxy carboxylic acid or one of those attached to the polyhydric alcohol residue. Thus this method may give a different type of ester from that obtained by esterifying a preformed fatty acid ester of a hydroxy carboxylic acid.

2. In place of the water-soluble polyhydric alcohol employed in method 1 above for esterification of carboxyl groups of the hydroxy acid, ethylene oxide, glycidol or water-soluble homologues of same may be used. The ester formed is then reacted with a fatty acid halide so as to esterify some but not more than one half of the free hydroxyl groups.

3. The hydroxy carboxylic acid may be acylated with fatty acid halide such as chloride or bromide, and the resulting ester esterified with alkyl epoxy compounds such as ethylene oxide, glycidol and water-soluble homologues of same.

4. Acylated hydroxy carboxylic acid may be esterified directly with an excess of polyhydric alcohol, esterification being stopped when polymerization is indicated by the appearance of insoluble or resinous products.

As in many chemical reactions of the above type, it is difficult to obtain a product which does not have some residual acidity. Consequently products prepared in accordance with the illustrations herein given will generally consist of a mixture of a predominant proportion of esters in which all of the carboxyl groups of the hydroxy acid are esterified and a minor proportion of esters having free hydroxy acid carboxyl groups. Of course conditions of preparation are employed which favor complete esterification of carboxyl groups but which at the same time favor the formation of a product in which a large proportion of the hydroxyl groups of the polyhydric alcohol remain unesterified. Products prepared from hydroxy carboxylic acids high in acid value such as tartaric, malic and the like will ordinarily have acid values not substantially over 100, usually less than 100. Products made from hydroxy carboxylic acids in which the hydroxyl groups predominate such as gluconic, xylonic, etc., will have lower acid values for the same degree of esterification.

The presence of some free acidity in the products of my invention, however, is not objectionable since their efficiency in use as surface active agents is not adversely affected. In fact their value is enhanced since with some residual acidity they show some activity as antioxidants for oils and fats.

The following examples are given to illustrate the manner in which my products may be prepared, it being understood that the invention is not limited thereto.

A. *Hydroxy carboxylic acid reacted with polyhydric alcohol and the product with fatty acid halide*

Example 1—Preparation of stearate of glycol tartrate.—In a vessel fitted with stirrer, thermometer, air condenser and gas lead-in tube, 500 parts ethylene glycol, 150 parts tartaric acid and 1 part sulfuric acid are heated in a stream of nitrogen at 130 to 140° C. for about 9 hours. The sulfuric acid is then neutralized by stirring in the calculated quantity of di-sodium phosphate, the charge transferred to a distilling vessel and the excess glycol distilled off in vacuum in a slow stream of nitrogen at 130 to 140° C. The residue obtained in the above manner will normally be a substantially colorless, very viscous liquid and will have an acid value in the neighborhood of 150. (Calc. acid value of tartaric acid=748.)

150 parts of this product (glycol tartrate) are dried by heating with toluene under a reflux condenser and water trap, and the toluene removed by distillation up to 135° C. About 400 parts of dry dioxane are then added forming a homogeneous, though slightly cloudy solution. The solution is heated to boiling under reflux and 100 parts of distilled commercial-"stearic"-acid chlorides are added slowly. The solution is boiled for 4 hours or until the evolution of hydrochloric acid gas has practically stopped, and then poured into brine, the ester taken up in ether, water washed, filtered and dried.

An ester prepared as above indicated contained a substantial portion of the stearic acid and palmitic acid esters of bis-(beta-hydroxyethyl) tartrate, had an acid value of about 42, was a hard, smooth solid of good color and was found to be very active as an interface modifier which improved the stability of emulsions formed from an oily phase and an aqueous phase. The ester was also tested as a dry cleaning assistant and was found to be very good.

Ethylene glycol citrate stearate and glycerol tartrate oleate and other compounds coming within the scope of this invention may be prepared in a manner similar to that indicated above.

B. *Preformed acylated hydroxy carboxylic acid reacted with an alkylene oxide*

Example 1—Preparation of glycerol ester of malic stearate.—40 parts malic stearate prepared by the reaction of stearyl chloride with malic acid in a known manner, and 15 parts glycidol are heated at 140° C. A homogeneous solution will usually be formed at this temperature. At the end of about 2½ hours the mixture will probably become cloudy and insoluble material, presumably polymers, will begin to settle out. Before appreciable polymerization is permitted to take place as indicated by such precipitation, the mixture is allowed to cool, then filtered with kieselguhr, for example, as filter-aid. If a purer product is desired the product may be boiled up with ether, the solution filtered and washed with brine, again filtered, evaporated, and the fat residue dried by heating in an oven at 110° C.

A pure product prepared in accordance with this method had an acid value of about 89, was light colored, and possessed surface active properties of high order.

C. *Acylated hydroxy carboxylic acid esterified directly with polyhydric alcohol*

Example 1—Glycerol ester of malic oleate.—40 parts of malic oleate prepared from malic acid and oleyl chloride are partially esterified with 18 parts glycerol by heating in the presence of a catalyst in boiling toluene, the toluene refluxing through a water trap. After several hours the treatment is discontinued and the fat is purified by filtration with kieselguhr as filter-aid. A product so prepared will have an acid value of about 75 and will be found to have very good surface active properties.

Water-soluble hydroxy carboxylic acids which may be employed in the preparation of the products of my invention are malic, tartaric, gluconic, glycollic, citric, tartronic, rhamnonic, trihydroxy glutaric, arabonic, xylonic, saccharic and others.

Water-soluble polyhydric alcohols which may be employed are water-soluble glycols, glycerol, water-soluble polyglycols, water-soluble polyglycerols, sorbitol, mannitol, dulcitol, erythritol and others.

Examples of alkylene epoxy compounds which may be employed are ethylene oxide, glycidol and homologues thereof.

High molecular fatty acids which find use are those having eight or more, and especially twelve or more, carbon atoms per molecule. Specific examples are palmitic, stearic, lauric, oleic, myristic, linoleic, and mixtures of fatty acids derived from the natural oils and fats such as tallow, cottonseed oil, corn oil, castor oil, hydrogenated oils and fats, etc.

Specific examples of compounds other than those previously mentioned yet coming within the scope of my invention are as follows:

Coconut oil fatty acid ester and stearic acid ester of tris-(beta-hydroxyethyl) citrate
Myristic acid ester of glyceryl monogluconate
Glyceryl tartrate laurate
Glycol malate linoleate Many other compounds could be mentioned and all will possess surface activity provided, of course, the compounds are nonresinous in nature and provided the ratio of the number of uncombined hydroxyl groups to the number of combined fatty acid groups is at least 1.

The products of the present invention are easily dispersible in water and of course possess, as previously stated, surface active properties of high order. The products find use in many industries where the modification of surface tension at an oil-water interface is desired. For example, the products may be used in emulsification and in the wetting of fabrics such as in dyeing, in the scouring of wool and in the treatment of leather. They materially assist in the penetration of active reagents in fibers. They may be used as assistants for other materials possessing wetting, emulsifying and penetrating properties and of course may be used in treatment baths of all kinds wherein the dispersion of oil in water or water in oil is of importance.

As above stated my products possess not only the advantages of surface active compounds heretofore prepared, but also the following additional advantages.

1. In comparison with monoglycerides, monoglycol esters, etc., the present products are much more active as interface modifiers.
2. They possess the advantage that they are more stable toward heat than surface active compounds of the acylated hydroxy acid type which decompose even at moderately elevated temperatures.
3. They are low in acid value and since they are very active and need be used only in small amount, usually less than 1%, it is possible to impart desired properties to an oil or fat without material change in the acidity of same.
4. The low-acid-value reaction products of the present invention possess in addition to their surface active properties, antioxidant properties which are of especial value when the products are employed in conjunction with oils and fats for edible consumption.

Thus the products herein diclosed and claimed represent a distinct advance in the art of surface active compounds and, having clearly described my invention, what I claim and desire to secure by Letters Patent is:

1. As a new composition of matter, a nonresinous, fat-soluble, surface active ester of a fatty acid having more than eight carbon atoms in the molecule, the alcohol part of the said ester being an ester of a water-soluble hydroxy carboxylic acid with a water-soluble polyhydric alcohol, and the ratio of the number of free OH groups to the number of combined fatty acid groups in the said composition being at least 1.

2. As a new composition of matter, a nonresinous fat-soluble surface active ester of a fatty acid having more than twelve carbon atoms, the alcohol part of the said ester being an ester of tartaric acid with a water-soluble polyhydric alcohol, and the ratio of the number of free OH groups to the number of combined fatty acid groups in the said composition being at least 1.

3. As a new composition of matter, a nonresinous fat-soluble surface active ester of a fatty acid having more than twelve carbon atoms, the alcohol part of the said ester being an ester of glycolic acid with a water-soluble polyhydric alcohol, and the ratio of the number of free OH groups to the number of combined fatty acid groups in the said composition being at least 1.

4. As a new composition of matter, a nonresinous fat-soluble surface active ester of a fatty acid having more than twelve carbon atoms, the alcohol part of the said ester being an ester of citric acid with a water-soluble polyhydric alcohol, and the ratio of the number of free OH groups to the number of combined fatty acid groups in the said composition being at least 1.

5. As a new composition of matter, a nonresinous, fat-soluble, surface active ester of a fatty acid having more than twelve carbon atoms, the alcohol part of the said ester being an ester of tartaric acid and glycerol, and the ratio of the number of free OH groups to the number of combined fatty acid groups in the said composition being at least 1.

6. As a new composition of matter, a nonresinous, fat-soluble, surface active ester of a fatty acid having more than twelve carbon atoms, the alcohol part of the said ester being an ester of glycolic acid and glycerol, and the ratio of the number of free OH groups to the number of combined fatty acid groups in the said composition being at least 1.

7. As a new composition of matter, a nonresinous, fat soluble surface active ester of a fatty acid having more than twelve carbon atoms, the alcohol part of said ester being an ester of citric acid and ethylene glycol, and the ratio of the number of free OH groups to the number of combined fatty acid groups in the said composition being at least 1.

8. As a new composition of matter, a nonresinous, acid reacting, fat soluble surface active ester of a fatty acid having more than twelve carbon atoms, the alcohol part of said ester being an ester of tartaric acid and glycerol, the ratio of the number of free OH groups to the number of combined fatty acid groups in the said composition being at least 1, and the acid value of the composition being not substantially over 100.

9. As a new composition of matter, a nonresinous, acid reacting, fat soluble surface active ester of a fatty acid having more than twelve carbon atoms, the alcohol part of said ester being an ester of glycolic acid and glycerol, the ratio of the number of free OH groups to the number of combined fatty acid groups in the said composition being at least 1, and the acid value of the said composition being not substantially over 100.

10. As a new composition of matter, a nonresinous, acid reacting, fat soluble surface active ester of a fatty acid having more than twelve carbon atoms, the alcohol part of said ester being an ester of citric acid and ethylene glycol, the ratio of the number of free OH groups to the number of combined fatty acid groups in the said composition being at least 1, and the acid value of the composition being not substantially over 100.

NATHANIEL BEVERLEY TUCKER.